Patented Nov. 4, 1947

2,430,326

UNITED STATES PATENT OFFICE 2,430,326

PRODUCTION OF DICHLOROPROPYLENES

Harry A. Cheney, Oakland, and Sumner H. McAllister, Lafayette, Calif., assignors to Shell Development Company, San Francisco, Calif., a corporation of Delaware No Drawing. Application July 30, 1945, Serial No. 607,921

12 Claims. (Cl. 260—654)

1

This invention relates to a process involving chlorination via substitution, and more particularly pertains to a practical and economical process of producing dichloropropylenes predominating in propylenes containing a chlorine atom in the vinyl position and a chlorine atom in the allyl position with respect to the double bond. In one of its specific embodiments, the invention covers a novel process for the chlorination, via substitution, of propylene to produce economically high yields of allyl vinyl dichloropropylenes, i. e., chlorinated propylenes containing both a chlorine atom in the vinyl position and a chlorine atom in the allyl position with respect to the double bond.

It has been previously discovered that unsaturated hydrocarbons and halo-substituted unsaturated hydrocarbons containing an olefinic linkage between two non-tertiary carbon atoms of aliphatic character, at least one of which is of secondary character, may be halogenated via allylic substitution to produce predominantly halo-substituted unsaturated hydrocarbons in which each molecule contains one more halogen atom than the starting organic material treated. This is disclosed and claimed in the Groll et al. patent—U. S. 2,130,084. According to the teachings of this patent the reaction of an unsaturated hydrocarbon with a halogen, when effected at the elevated temperatures specified therein, results in allylic halo-substitution. In other words, the halogen atom is substituted for a hydrogen atom on a carbon atom which is linked by a single bond directly to an unsaturated carbon atom. According to said patent, in order to effect the allylic halo-substitution reaction and at the same time avoid, or at least materially decrease, the formation of halo-addition products, it is necessary to prevent any contact of the reactants (i. e., the unsaturated organic compound and the halogen) with each other at the relatively low temperatures which favor halogen addition. The patent states that it is, therefore, not only necessary to effect the halogenation reaction at the elevated temperatures set forth in the above patent, namely between about 200° C. and the temperature at which substantial degradation of the organic materials occurs (which temperature, for the chlor-substitution of propylene, is preferably within the range of from 350° C. to 675° C.), but also to preheat either or both of the reactants prior to their mixing, so that the mixture when formed is at a temperature above that at which the halo-

2 genation of the unsaturated organic compounds is predominantly via addition.

In order to effect monohalogenation (via substitution) of the unsaturated organic material, the Groll et al. patent teaches that it is essential to employ the unsaturated organic compound in an excess over the stoichiometric amount which will react, via substitution, with the applied halogen. For instance, the patent mentions that the olefinic compound to halogen mole ratios of from 2:1 to 7:1 and higher have been found to be suitable for the production of high yields of halo-substituted unsaturated compounds containing one more halogen atom per molecule than the starting organic material treated.

When propylene is subjected to the action of chlorine in accordance with the teachings of the discussed Groll et al. patent, the chlorinated reaction product predominates in allyl chloride. For instance, as described in Example VIII of the patent, when propylene and chlorine were separately preheated to temperatures of from about 400° C. to about 600° C. and mixed in mole ratios of from about 2:1 to about 6.6:1, and then conveyed through a reaction zone wherein the reaction temperature was between about 435° C. and about 665° C. the reaction products predominated in allyl chloride, the yields of which were as high as 85.5%. Only minor amounts of polychlorinated compounds (both saturated and unsaturated) were formed.

Although monohalogenated unsaturated hydrocarbons, e. g., allyl chloride, are highly valuable compounds which find utility as such or as intermediates, it has recently been discovered that at least certain of the polyhalogenated unsaturated organic compounds are highly desirable as soil fumigants and disinfectants. Thus, it has been known for some time that the nematode or eel worm, which is widely distributed in soils throughout the world, attacks almost all plants and trees, including most food crops. For instance, one species thereof, *Heterodera marioni*, which is distributed throughout the temperature, subtropical and tropical regions of the world, attacks a large number of plants, causing them to be weakened and be readily susceptible to disease. It has been found that the allyl vinyl dihalo-unsaturated hydrocarbons, i. e., unsaturated hydrocarbons containing a halogen atom in the vinyl position and a halogen atom in the allyl position with respect to the double bond, are effective agents for fumigating and disinfecting soils and particularly for the control of nematodes. It has been further discovered that dichloropropylenes in which one of the chlorine atoms is on one of the unsaturated carbon atoms, while the other chlorine atom is directly linked to the saturated carbon atom, as well as mixtures containing these dichloropropylenes and other polychlorinated derivatives of propylene, are particularly effective for this purpose.

It was mentioned above that the high-temperature chlorination of propylene in accordance with the teachings of the Groll et al. patent produces predominantly allyl chloride when this chlorination is effected, in accordance with the teachings of said patent, while employing high ratios of propylene to chlorine. The reaction products formed under such conditions contain only small percentages of the aforementioned dichloropropylenes suitable as agents for fumigating and disinfecting soils, and particularly as nematocides. Although the yield of the desired dichloropropylenes may be increased by effecting the chlorination of propylene in accordance with the above-described patented process while using relatively lower mole ratios of olefin to chlorine, i. e., ratios of below about 2:1, the reaction products thus produced still contain large amounts of the monochlorinated compound, i. e., allyl chloride, as well as other reaction products. Therefore, the use of this process for the production of the desired allyl vinyl dichloropropylenes (i. e., 1,3-dichloropropene-1 and 1,2-dichloropropene-2) is complicated and uneconomical.

The production of dichloropropenes by the high temperature chlorination of allyl chloride, although possible, is uneconomical and difficult, at least for the following reason: As mentioned above, in order to introduce (via substitution) a single chlorine atom into the molecule of an unsaturated organic compound to be chlorinated via substitution, it is essential to realize the chlorination reaction while using high mole ratios of the unsaturated organic compound to the applied chlorine. Also, as will be explained below, in order to effect chlor-substitution while avoiding or materially inhibiting undesirable side reactions including carbon formation, it is essential to preheat either or both of the reactants prior to their mixing so that the reactants when mixed are at a temperature above that at which the condensation of products of chlorine addition may occur. Generally, it has been found that this may be done by preheating only the unsaturated organic compound to a sufficiently elevated temperature and mixing it in the necessary ratio with chlorine introduced into the mixing zone at substantially room temperature. As will be shown in the examples submitted hereinbelow, the high-temperature chlorination of allyl chloride, when effected substantially in accordance with the above-mentioned process, results in the production of polychlorinated compounds predominating in the above-mentioned dichloropropylenes. However, this reaction also causes substantial degradation of the organic compounds with the resultant formation of large amounts of carbon which is deposited throughout the apparatus and particularly in the mixer and/or reactor. This carbon deposit clogs the apparatus and necessitates frequent interruptions of the chlorination reaction for purposes of dismantling of the apparatus and the costly and cumbersome removal of the carbon. Manifestly, such procedure is highly uneconomical, especially due to the hardness of the deposited carbon, the removal of which, as is well known, is difficult.

It is therefore the main object of the present invention to obviate the above and other defects and difficulties and to provide a process for the economical commercial-scale production of dichloropropylenes. Another object is to provide a process whereby dichloropropylenes containing a chlorine atom on an unsaturated carbon atom and a chlorine atom on the saturated carbon atom may be produced economically on a commercial scale. Still another object is to provide a process for the chlorination of propylene to produce high yields of the above class of dichloropropylenes. Still other objects will be apparent from the following description of the present invention.

It has now been discovered that the above and other objects may be attained by subjecting mixtures consisting of or comprising propylene and allyl chloride to the action of molecular chlorine at temperatures which favor monochlor-substitution. Broadly stated, the invention is based on the discovery that the reaction of a substantially equimolecular mixture of propylene and allyl chloride (or at least of mixtures containing substantial amounts of both of these unsaturated organic compounds) with chlorine at the elevated temperatures favoring chlor-substitution results in the formation of a reaction mixture in which the allyl chloride concentration is substantially the same as that in the starting mixture, the chlorine reacting with the propylene to produce polychlorinated unsaturates predominating in dichlorinated propylenes containing chlorine atoms in both the allyl and the vinyl positions. It has been further discovered that the carbon formation which occurs when allyl chloride alone is subjected to the high temperature chlor-substitution reaction may be substantially inhibited by first preheating the propylene to a desired or optimum temperature, mixing said preheated propylene with allyl chloride, which may or may not be vaporized prior to such mixing, and then contacting said heated mixture with chlorine to effect the desired chlor-substitution reaction. As is explained below, the propylene-allyl chloride mixture at the time of contact thereof with the chlorine must be at a temperature such that the resultant total mixture is above the temperature at which chlor-addition products may be condensed. Since the preheating of the allyl chloride alone to very high temperatures results in excessive decomposition and/or carbon formation, the process of the present invention, in its preferred embodiment, is effected by preheating the propylene prior to its mixing with the allyl chloride and the chlorine to such a temperature that when this preheated propylene is mixed with the allyl chloride and the chlorine (which latter two compounds may or may not have been also moderately preheated), the resultant reaction temperature is such that the main reaction is that of chlor-substitution.

When chlorine is contacted with propylene and/or allyl chloride at temperatures below 100° C., the predominant chlorination reaction is via addition. In fact, chlorine addition occurs predominantly even at temperatures as high as about 200° C. The approximate observed temperature range within which the chlorination of propylene appears to change from chlorine addition to chlor-substitution is between about 200° C. and about 350° C. The presence of liquid addition products, particularly on wall surfaces catalyzes the further chlorination via addition. Also, it is considered at the present time that the presence of such liquefied products of chlor-addition, even in small amounts, in the mixing zone causes excessive carbonization in the reactor. Therefore, in order to produce the above-mentioned dichloropropylenes by the chlorination of a mixture comprising or consisting of propylene and allyl chloride, it is essential to preheat the reactants or at least the propylene to such a temperature or temperatures that the mixture formed by the contacting of the propylene-allyl chloride mixture with chlorine is at a temperature above that at which condensation of films of chlor-addition products occurs, namely above about 120° C. Since chlorine has a much lower specific heat than propylene, it is possible to introduce chlorine at substantially atmospheric or room temperature and preheat the propylene alone or together with the allyl chloride to a slightly higher temperature than would be necessary if all three reactants were separately preheated to the above-mentioned minimum temperature. The upper limit of the preheating temperature is, to a certain extent, fixed by the temperature at which excessive cracking of the unsaturated organic compound or compounds will occur in the preheating zone, or which will produce excessive temperatures in the reaction zone.

The chlor-substitution reaction, which may be effected in an empty or packed tube and in the presence or absence of a catalyst, occurs at a temperature above that at which chlor-addition takes place, e. g. above about 200° C., but below the temperature at which substantial degradation and excessive carbon formation will occur. In order to produce a chlorinated product predominating in the above-mentioned vinyl allyl dichloropropylenes it is preferred to effect the chlor-substitution reaction at a temperature in the range of 350° C. to 675° C., although somewhat higher temperatures may also be employed, particularly when very high space velocities are employed. When operating in this temperature range, the chlorine addition reaction is suppressed to such an extent that only very small amounts (less than 2% to 3%) of products of chlor-addition are obtained. In general, after the critical temperature is reached the amount of chlor-addition decreases and the amount of chlor-substitution increases as the temperature is raised. By operating at sufficiently high temperature the chlor-addition may be almost completely suppressed. Highly satisfactory yields of the desired dichloropropylenes have been obtained when the maximum reaction temperature was in the neighborhood of 500° C.

Although the reaction may be effected with either the chlorine or the unsaturated organic compounds in excess, or by using equimolecular amounts of chlorine and of the two unsaturated organic compounds, it is preferred to employ an excess of the unsaturated organic compounds because, in such cases, the yield of the desired products based on the applied chlorine is better and the temperature control is facilitated. Mole ratios of unsaturated organic compounds to chlorine of from about 2:1 to about 7:1, and higher, may be employed. By using lower mole ratios there is a greater tendency to form chlorinated unsaturated and/or saturated compounds containing more than two chlorine atoms per molecule. Highly satisfactory results were obtained with unsaturate-to-chlorine mole ratios of from about 2:1 to about 3:1.

The mole ratio of the allyl chloride to propylene in the mixture introduced into the zone wherein these unsaturated organic compounds are contacted with the chlorine may also vary within a relatively wide range. Although either compound may be present in excess, it is preferred to employ the allyl chloride in amounts at least equimolecular to the applied propylene. In some cases it is found that in order to maintain controlled conditions, and for the purpose of obtaining high yields of the desired allyl vinyl dichloropropylenes, it is advantageous to employ the allyl chloride in amounts somewhat greater than equimolecular. For instance, allyl chloride-to-propylene mole ratios of from 0.5:1 to 3:1 and higher have been successfully employed.

The space velocity or rate of passage of the reactants through the reaction zone will depend upon the design of the reaction chamber, upon the temperature employed and upon the mole ratio of the unsaturated organic compound to the chlorine in the mixture reacted. In general, good results are obtained by employing the maximum flows that can be reacted in a given reactor. Thus, the rate of production in given equipment is at a maximum and the time during which the reaction products are maintained at the reaction temperature is reduced to a minimum. The reaction tube or chamber may be of any suitable material, e. g., carbon, steel, nickel, quartz, Monel metal, etc. Since the chlor-substitution reaction is exothermic, considerable heat is liberated during its occurrence. Overheating of the reaction chamber may be avoided by the use of conventional internal and/or external cooling means, by the use of normally gaseous diluents or by the evaporation of an internal cooling agent, so that there is substantially instantaneous dissipation of heat uniformly throughout the reaction mixture. Also, as mentioned, temperature control may be attained by using relatively high excesses of the unsaturated organic compounds, such excess functioning as a diluent. The chlorine may be introduced at a plurality of separate points along the reaction tube, while the mixture of propylene and allyl chloride is conveyed through the whole length of the reaction zone where it is maintained within the desired reaction temperature range.

The halo-substitution of chlorine into propylene to produce the desired dichloropropylenes which occurs when effected in accordance with the present process does not require any activating media or promoters. However, if desired, the rate of the chlor-substitution reaction may be accelerated by the use of light and/or of halogenation catalysts. When photochemical accelerating means are used, suitable light-giving devices such as ultraviolet lamps, etc., may be provided around the reaction chamber, which is constructed of some material, such as quartz, which permits passage through its walls of the reaction-accelerating light. Suitable catalysts which may be employed are, among others, carbon, antimony halides, tin halides, and other known halogenation catalysts. Other conditions being the same, the use of halogenation-accelerating agents, such as light and/or catalysts, may permit execution of the chlor-substitution reaction at lower temperatures.

The process of the present invention, although applicable to the batch or intermittent production of the desired dichloropropylenes, is particularly applicable for continuous operations. A preferred method of producing the dichloropropylenes in accordance with the present process comprises the continuous preheating of the propylene to the desired or necessary temperature, continuous mixing of this preheated propylene with allyl chloride vapors in the desired or optimum mole ratios, thorough mixing of the allyl chloride-propylene mixture with chlorine at temperatures of above 120° C. and preferably at or above 150° C., continuous conveyance of the mixture at a suitable space velocity through a reaction zone in which the reactants are maintained at a temperature favoring chlor-substitution, e. g., between 350° C. and 675° C., continuous fractional condensation of the reaction products to separate therefrom the unreacted propylene, if any, and the formed hydrogen chloride, continuous fractionation of the remaining liquefied fraction to separate the allyl chloride, and continuous recycling of said allyl chloride and unreacted propylene together with additional amounts of preheated propylene and of chlorine through the reaction zone for the production of further quantities of the products of chlor-substitution.

To avoid the occurrence of secondary reactions, such as the reaction of the unsaturated reactants and/or reaction products with the hydrogen chloride formed during the occurrence of the primary chlor-substitution reaction, it is desirable if not necessary to cool the reaction mixture and, as mentioned above, to separate the hydrogen chloride and the unreacted chlorine, if any is present, from the reaction products substantially as soon as it leaves the reaction zone. This may be achieved in a variety of suitable manners, such as the above-mentioned fractional condensation. Also, the reaction mixture substantially as soon as it leaves the reaction zone may be contacted with a suitable selective solvent for the hydrogen chloride, e. g. water, in a conventional scrubber, and the hydrogen chloride absorbed and separated from the reaction product. Alternatively, the reaction mixture may be subjected to a neutralization treatment with a suitable base.

The invention is illustrated by the following specific examples, it being understood that there is no intention of being limited by any specific details thereof, since many variations may be made.

Example I

Propylene preheated to a temperature of about 350° C. was continuously mixed with the vapors of an allyl chloride fraction maintained at a temperature of about 93° C. This allyl chloride vapor fraction analyzed 95.6% allyl chloride, 4.0% 2-chloropropene, and 0.4% isopropyl chloride. The mole ratio of allyl chloride to propylene was about 1.44:1. The resulting mixture of unsaturated organic compounds, which was at a temperature of about 196° C., was then continuously conveyed into a mixer wherein it was intimately and continuously mixed with chlorine introduced in such amounts that the mole ratio of the above unsaturated organic compounds to chlorine was 2.2:1. The mole ratio of propylene to allyl chloride to chlorine was thus about 0.9:1.3:1.0. This mixture was then conveyed continuously at a total feed rate of about 4.14 pound moles per hour through an empty reactor having a volume of 1.2 cubic feet, the space velocity in the reactor being equal to 3.5 pound moles per cubic foot of reactor space per hour. The maximum reaction temperature in the reactor was about 510° C. The effluent leaving the reactor was substantially immediately conveyed into a fractionating column maintained at a pressure of about 10 pounds per square inch gage. The hydrogen chloride formed as a byproduct in the chlor-substitution reaction, as well as the unreacted propylene, was withdrawn as a vapor from the upper portion of the fractionator and conveyed into a scrubber wherein these vapors were scrubbed with water to remove the hydrogen chloride and liberate the unreacted propylene. The liquefied fraction withdrawn from the bottom of the partial condenser was fractionated to recover separately the unreacted allyl chloride and the various polychlorinated organic compounds. The chlorination of propylene was continued in this manner for a period of 57 hours. An inspection of the apparatus showed only very small amounts of carbon deposition in the allyl chloride vaporizer. This amount was equal to about 0.017 lb. per 1000 lbs. of allyl chloride feed. At the point of mixing of the allyl chloride with the preheated propylene a small amount of carbonaceous material was found, amounting to about 0.016 pound per 1000 pounds of allyl chloride feed. A portion of this carbonaceous material was collected in the line strainer immediately downstream of the mixing point. Carbonization in the reactor proper amounted to only 0.64 pound per 1000 pounds of chlorine feed. The carbon was hard and brittle and was deposited on the reactor walls to a thickness of only 0.03 inch. The mixing jet was entirely clean.

An analysis of the reaction products showed that only about 1 pound of allyl chloride was consumed per 100 pounds of chlorine, the consumption of propylene being about 24 pounds per hour. The polychlorinated products amounted to about 77 pounds per 100 pounds of chlorine feed or 300 pounds per 100 pounds of propylene consumed. This chlorinated fraction contained about 77% dichlorides and 20% of higher boiling polychlorinated organic compounds boiling above 122° C. The dichloropropylenes comprised about 97% of the dichlorides, or about 75% of the total polychlorinated fraction obtained.

Example II

Preheated propylene, allyl chloride and chlorine were mixed at a temperature of about 281° C., these three compounds being fed in such amounts that the mole ratio of propylene to allyl chloride to chlorine was 1.5:1.5:1. This mixture was then conveyed through an empty reactor having a volume of 0.325 cu. ft., the total space velocity being 13.9 pound moles per cu. ft. of reactor space per hour. The maximum temperature in the reactor was 510° C. The run was continued for 18.5 hours. The effluent leaving the reactor was treated in the same manner as in Example I. The respective net yields of allyl chloride and polychlorinated organic compounds were 22 pounds and 72 pounds per 100 pounds of chlorine feed, or 46 pounds and 154 pounds per 100 pounds of propylene consumed. These values correspond to a net production of only 0.30 pound of allyl chloride per pound of polychlorinated compounds formed. This polychlorinated fraction contained 80% dichlorides, 75% of which were unsaturated dichlorides, while only 14% boiled above 123° C. The carbon deposition in the reactor amounted to only 0.6 pound per 1000 pounds of chlorine feed. The mixing jet at the entrance to the reactor was very clean; the carbon deposit in the preheater was only 0.06 pound per 1000 pounds of allyl chloride feed.

Example III

In this run, vaporized allyl chloride at a temperature of about 100° C. was mixed with propylene vapor heated to such a temperature that the temperature of the mixture at the reactor mixing jet, i. e., the point of mixing of these unsaturates with chlorine, was 218° C. The mole ratio of propylene to allyl chloride to chlorine was 1.5:1.2:1. This mixture was then conveyed through the empty reactor having a volume of 0.325 cu. ft. at such a rate that the total space velocity was 9.2 pound moles per cu. ft. of reactor space per hour. The maximum reaction temperature was 510° C. This run was continued for approximately 74 hours. The respective net yields of allyl chloride and polychlorinated compounds were 22 pounds and 71 pounds per 100 pounds of chlorine feed, or 46 pounds and 152 pounds per 100 pounds of propylene reacted. These values correspond to a net production of only 0.30 pound of allyl chloride per pound of polychlorinated compounds formed. The carbon deposition in the vaporizer was 0.015 pound per 1000 pounds of allyl chloride feed. The polychlorinated fraction contained about 76% dichlorides and about 18% of polychlorinated compounds boiling above 123° C.

Example IV

In this run dichloropropylenes were produced by the high-temperature chlorination of allyl chloride. For this purpose allyl chloride preheated to a temperature of about 427° C. was mixed with chlorine in a mole ratio of 3.32:1 and was then conveyed through a reactor having a volume of about 0.2 cu. ft. The total space velocity through the reactor was equal to 11.1 pound moles per cu. ft. of reactor space per hour. The maximum reaction temperature was 510° C. The run was continued for about 9¾ hours, at the end of which time it was found that the carbon deposition amounted to 5.8 pounds per 1000 pounds of chlorine feed. The organic phase separated from the effluent contained 66.0% by weight of allyl chloride and 34.0% by weight of polychlorinated compounds. This latter consisted of 3% of compounds boiling below 80° C. and about 75% of dichloropropylenes, the remainder being polychlorinated compounds boiling above 120° C. The dichloropropylenes consisted primarily of the cis and trans 1,3-dichloropropylenes and minor amounts of 2,3-dichloropropene-1 and 3,3-dichloropropene-1.

A comparison of the results obtained in the above-described runs shows the advantages attained by subjecting propylene to the action of chlorine at elevated temperatures and in the presence of substantial amounts of allyl chloride. The last example shows that the chlorination of allyl chloride alone results in substantial carbonization, which necessitates frequent interruptions of operation. Also, the examples show that by properly regulating the ratios of the propylene to allyl chloride and to chlorine, and by regulating the space velocity, it is possible to produce dichloropropylenes without any substantial increase in the net production of allyl chloride. Under such conditions the allyl chloride separated from the effluent may be recycled and mixed with fresh amounts of propylene so that, in effect, the dichloropropylenes are produced from propylene which is fed continuously or otherwise into the reaction system.

In the Groll et al. patent described above it is taught that the high-temperature chlorination of unsaturated organic compounds containing an olefinic linkage between two non-tertiary carbon atoms of aliphatic character, at least one of which is secondary, occurs via allylic substitution. In other words, the chlorine atom attaches itself to the saturated carbon atom which is directly linked to one of the unsaturated carbon atoms. The dichloropropylenes produced in accordance with the present process contain a chlorine atom in the allyl position and another chlorine atom in the vinyl position with respect to the double bond, the predominant fraction of the dichloropropylenes produced in accordance with the process consisting of the cis and trans 1,3-dichloropropylenes. The exact reason for this apparent inconsistency is not known. It is possible that the chlorination of propylene (or of allyl chloride) first produces 3,3-dichloropropene-1, which in turn isomerizes or rearranges to the 1,3-dichloropropylenes. In accordance with another theory, allyl chloride, which may be an intermediary, reacts with chlorine to split off one of the hydrogen atoms attached to the saturated carbon atom to produce the radical

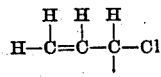

which rearranges itself to the radical

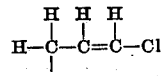

which in turn reacts with the chlorine atom to produce the 1,3-dichloropropylenes. Whatever may be the theory of the case, the chlorination in accordance with the process of the present invention produces dichloropropylenes approximately 90% of which consist of the cis and trans 1,3-dichloropropylenes, i. e., chlorinated propylenes in which each molecule contains a chlorine atom in both the allyl and the vinyl positions.

1. A process for the continuous production of polychlorinated propylenes predominating in the cis and trans 1,3-dichloropropylenes, which comprises continuously preheating propylene to a temperature of about 350° C., continuously mixing said preheated propylene with allyl chloride vapors to form a mixture which is at a temperature of between about 150° C. and about 200° C. and which contains between about 0.5 and about 3.0 moles of allyl chloride per mole of propylene, continuously mixing said mixture with chlorine in an unsaturate-to-chlorine mole ratio of between about 2:1 and about 3:1, continuously passing said compounds through a reaction zone maintained at a maximum temperature of about 500° C. thereby effecting the chlorination via substitution, and the production of predominantly dichloropropylenes, continuously withdrawing the reaction mixture from said reaction zone, fractionally condensing said mixture to separate as a vapor the unreacted propylene and the hydrogen chloride formed as a byproduct, subjecting the liquefied fraction containing the produced dichloropropylenes to distillation to recover the allyl chloride, continuously mixing at least a part of said allyl chloride with additional amounts of preheated propylene and with chlorine, and recycling said mixture through the reaction zone to produce further amounts of polychlorinated propylenes predominating in the cis and trans 1,3-dichloropropylenes.

2. A process for the continuous production of polychlorinated propylenes predominating in cis and trans 1,3-dichloropropylenes, which comprises continuously preheating propylene, continuously mixing it with substantial amounts of allyl chloride vapors to form a mixture which is at a temperature of at least 120° C., continuously mixing said mixture with chlorine in an unsaturate-to-chlorine mole ratio of between about 2:1 and about 7:1, continuously passing the resultant mixture through a reaction zone maintained at a temperature of between about 350° C. and about 675° C., separating the allyl chloride and the polychlorinated organic compounds from the reaction mixture, and continuously cycling at least a part of the allyl chloride, together with additional amounts of preheated propylene and chlorine, through the reaction zone to produce further quantities of the polychlorinated derivatives predominating in the aforesaid dichloropropylenes.

3. The process according to claim 2, wherein the allyl chloride-to-propylene mole ratio is maintained at between about 0.5:1 and about 3.0:1.

4. In a process for the production of dichloropropylenes predominating in cis and trans 1,3-dichloropropylenes, the steps of preheating propylene to a temperature of above 200° C., mixing said preheated propylene with allyl chloride vapors in an allyl chloride-to-propylene mole ratio of between about 0.5:1 and about 3.0:1, mixing said unsaturated organic compounds at a temperature of at least 120° C. with chlorine in an unsaturates-to-chlorine mole ratio of between about 2:1 and about 7:1, and effecting the chlorination reaction at a temperature of between about 350° C. and about 675° C. thereby obtaining dichloropropylenes predominating in the 1,3-dichloropropylenes without any substantial net production of allyl chloride.

5. In a process for the production of dichloropropylenes predominating in cis and trans 1,3-dichloropropylenes, the steps of preheating propylene, mixing said preheated propylene with allyl chloride vapors in an allyl chloride-to-propylene mole ratio of between about 0.5:1 and about 3.0:1, mixing said unsaturated organic compounds, at a temperature of at least 120° C., with chlorine in an unsaturates-to-chlorine mole ratio of between about 2:1 and about 7:1, and effecting the chlorination reaction at a temperature of between about 350° C. and about 675° C.

6. In a process for the production of dichloropropylenes predominating in cis and trans 1,3-dichloropropylenes, the steps of preheating propylene, mixing said preheated propylene with allyl chloride vapors in a ratio of from about 0.5 mole to about 3.0 moles of allyl chloride per mole of propylene, mixing said unsaturated organic compounds at a temperature of above 120° C. with chlorine in an unsaturates-to-chlorine mole ratio of between about 2:1 and about 7:1, and effecting the chlorination reaction at a temperature of between about 200° C. and the temperature at which substantial degradation is favored.

7. In a process for the production of dichloropropylenes predominating in cis and trans 1,3-dichloropropylenes, the steps of preheating propylene, mixing it with a substantial amount of allyl chloride to form a mixture of said unsaturated organic compounds, mixing said mixture at a temperature of at least 120° C. with chlorine in an unsaturates-to-chlorine mole ratio of between about 2:1 and about 7:1, and effecting the chlorination reaction at a temperature of between about 200° C. and the temperature at which substantial degradation is favored.

8. In a process for the production of dichloropropylenes predominating in cis and trans 1,3-dichloropropylenes, the steps of mixing preheated propylene with allyl chloride vapors in an allyl chloride-to-propylene mole ratio of between about 0.5:1 and about 3.0:1, contacting said mixture at a temperature of above 120° C. with chlorine, and effecting the chlorination reaction at a temperature of between about 200° C. and the temperature at which substantial degradation is favored.

9. The process according to claim 8 wherein the propylene is preheated to such a temperature that the mixture thereof with the allyl chloride vapors is at a temperature of above 120° C.

10. The process according to claim 8 wherein the chlorine is employed in an amount less than that stoichiometrically necessary to react, via substitution, with the unsaturated organic compounds.

11. In a process for the production of dichloropropylenes having the chlorine atoms in the allyl and vinyl positions, the steps of preheating propylene, mixing said preheated propylene with a substantial amount of allyl chloride, mixing said unsaturated organic compounds, at a temperature of above 120° C. with chlorine and effecting the chlorination reaction at a temperature of between about 200° C. and the temperature at which substantial degradation is favored.

12. In a process for the production of dichloropropylenes having the chlorine atoms in the allyl and vinyl positions, the steps of contacting a preheated mixture containing substantial amounts of propylene and allyl chloride, at a temperature of above 120° C., with chlorine and effecting the chlorination reaction at a temperature of between about 200° C. and the temperature at which substantial degradation is favored.

HARRY A. CHENEY.
SUMNER H. McALLISTER.

REFERENCES CITED

The following references are of record in the file of this patent:

UNITED STATES PATENTS

| Number | Name | Date |
|---|---|---|
| 2,130,084 | Groll et al. | Sept. 13, 1938 |
| 2,278,527 | Rust et al. | Apr. 7, 1942 |
| 2,284,479 | Rust et al. | May 26, 1942 |
| 2,296,614 | Hearne | Sept. 22, 1942 |

FOREIGN PATENTS

| Number | Country | Date |
|---|---|---|
| 468,016 | Great Britain | June 28, 1937 |
| 495,900 | Great Britain | Nov. 22, 1938 |
| 502,611 | Great Britain | Mar. 21, 1939 |